Nov. 25, 1969   E. H. LAND ET AL   3,479,942
CAMERA APPARATUS

Filed Sept. 19, 1967   2 Sheets-Sheet 1

INVENTOR.
Edwin H. Land
and
Vaito K. Eloranta
BY
Brown and Mikulka
ATTORNEYS

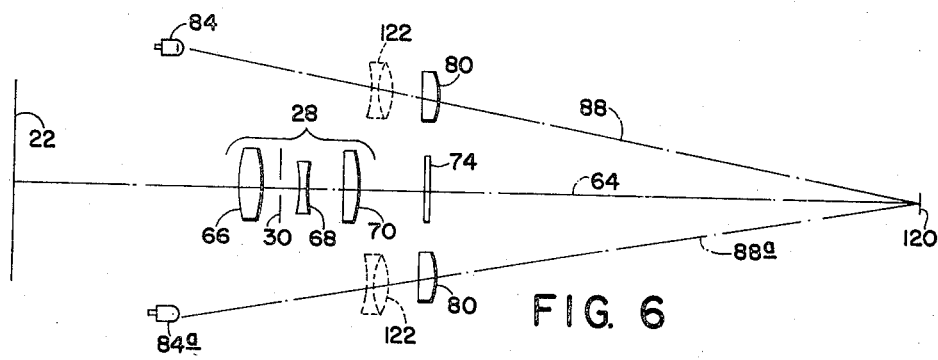
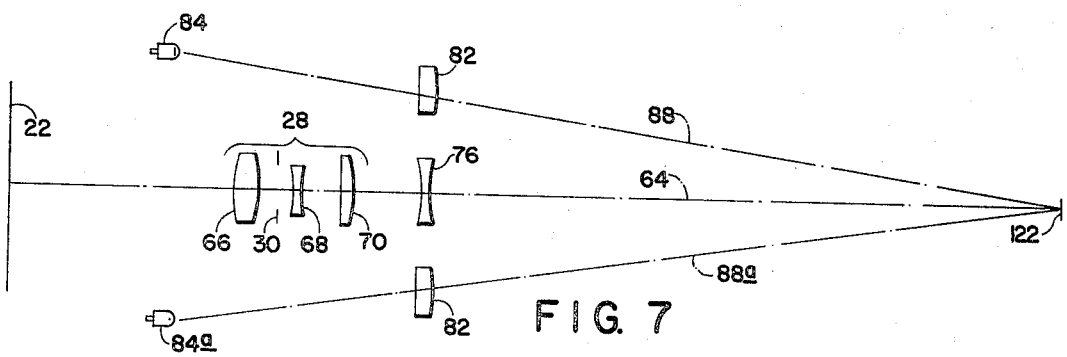
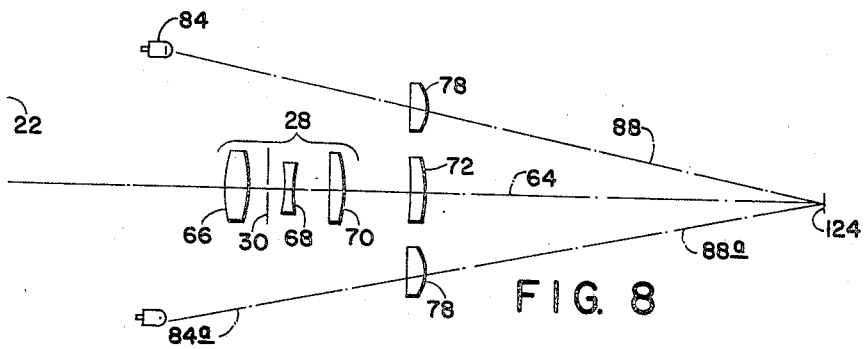

United States Patent Office 3,479,942
Patented Nov. 25, 1969

3,479,942
CAMERA APPARATUS
Edwin H. Land, Cambridge, and Vaito K. Eloranta, Needham, Mass., assignors to Polaroid Corporation, Cambridge, Mass., a corporation of Delaware
Filed Sept. 19, 1967, Ser. No. 668,871
Int. Cl. G03b 3/02
U.S. Cl. 95—44                                    18 Claims

ABSTRACT OF THE DISCLOSURE

An easily-operated camera embodying flash equipment; a set of lenses supplemental to the camera objective for adjusting focus to a plurality of given subject distances or zones; a set of projection lenses for projecting a pair of converging light beams from a pair of light sources so as to visually establish the subject distances. There is a slidable manually-adjustable plate at the camera front for mounting and functionally positioning complementary lenses of both sets; and means interlocking the plate with an adjustable diaphragm for varying the aperture thereof in conjunction with the positioning of the lenses. A given shutter speed is provided. With a single movement of the slidable plate, all distance, focusing and aperture adjustments necessary to the taking of a perfect picture are performed automatically. The camera also includes means for accommodating to either black-and-white or color film of relatively different ASA film speeds.

---

The camera of the present invention is, in large measure, based upon the premise that a great deal of photography of widespread family interest is of a generally close-up nature and can most readily be performed in the home, principally in the evening. However, to achieve consistent success in picture-taking of a low-level illumination category there has usually been required a considerable knowledge of photography and a camera which, from an operational and cost viewpoint, is beyond the capabilities and resources of the average photographer. While not limited thereto, it is contemplated that the subject camera may advantageously be adapted to use a film material and incorporate processing means therefor of types similar to those produced by Polaroid Corporation, Cambridge, Mass., U.S.A. This reasoning is based upon the belief that most "home" photography involves taking pictures of people under fleeting conditions of expression and pose and the known advantage of being able to immediately see and check the result of each exposure.

Assuming the foregoing considerations to be correct and the need of filling what is believed to have long been a lack in the photographic field, namely, a camera especially adapted to evening use in the home when desirable subject material is most readily available, a dominant purpose of the present invention is to provide at reasonable cost a camera incorporating simple operational features which, in the hands of the average picture-taker, is capable of invariably producing high-quality pictures under low-level ambient light conditions; to provide a camera of the aforesaid category comprising a two-beam distance-establishing projection means and supplemental focusing means embodied in a manually-operated plate at the camera front; to provide a camera of the character described comprising the aforesaid distance-establishing and focusing means coupled to aperture-adjusting means; to provide a camera of the type stated which is adapted to use either black-and-white or full-color film materials of relatively different ASA film speeds; to provide a camera which, because of its special adaptability to the photography of people and other subject matter in the home, incorporates processing means for producing a finished photographic print immediately following each exposure; and to provide a camera, as characterized, which is operative on a fixed time basis in conjunction with the shutter means having a given speed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGS. 6, 7 and 8 are diagrammatic plan views of the optical system of the camera illustrating the characteristics and arrangement of compounds for the intermediate, long and short distance setting, respectively.

Figure 1:
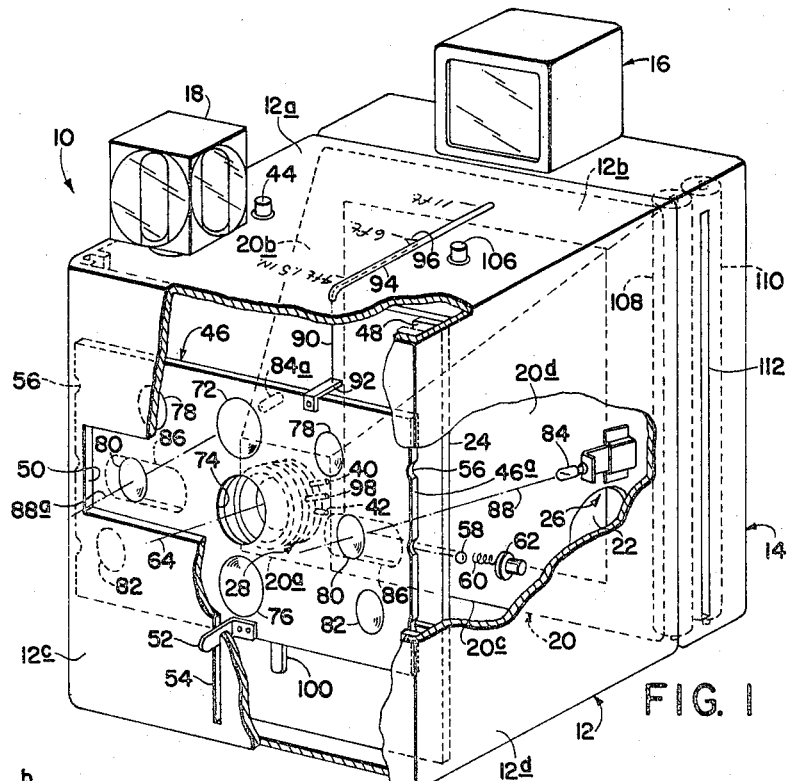
FIGURE 1 is a diagrammatic perspective view of the camera of the invention with parts broken away.

Referring now to the drawings, the camera 10 is shown from the front in FIGURE 1. It includes front and rear housing sections 12 and 14, respectively, the latter being removably attached by any suitable latching means, not shown. Subject framing means 16 is mounted on a laterally-centered upper surface of the camera, for example, on the section 14. No other finder means is required. A flash-cube 18 is mounted for rotation on the upper wall 12a of section 12.

A tapered internal exposure chamber 20, flaring rearwardly toward a focal plane at 22 to accommodate to the diverging light rays of a photographic exposure is provided. Its apertured front wall 20a is attached to the similarly-apertured rear surface of an internal transverse partition or web 24. Its flared upper wall 20b, lower wall 20c and side walls 20d are attached to the frame-like partial rear wall portions 12b of the front housing section 12 which provide an exposure opening 26 at the focal plane. The terms "front" and "rear" or their equivalents, as applied refer to proximity or remoteness relative to the front of the camera; the terms "upper" or "lower" or their equivalents assume the camera to be positioned as shown in FIGURE 1.

A lens-shutter-diaphragm assembly 28 as, for example, a three-element objective and a between-the-lens combined shutter and diaphragm 30 of a suitable iris or other type, is mounted in the aligned apertures of the mutually-attached front wall 20a and web 24. The shutter-diaphragm component shown by way of example is mounted in a rotatable ring 32, the turning of which actuates the blades thereof to vary the size of the aperture 34 in a known manner. The ring 32 is mounted for rotation within an outer ring 36, but normally is held against such rotation by a frictional contact with the outer ring provided by a plurality of small compression springs 38 mounted in peripheral indentations of the ring 32 and bearing against the inner surface of the ring 36. Thus both rings are normally adapted to rotate together, excepting during an adjustment setting to be described below. Two pins 40 and 42 project radially from the ring 36 and are employed for rotating both rings simultaneously to effect operational variances of the aperture 34, to be described hereinafter.

Any suitable means for driving the shutter may be employed, e.g., a spring, a solenoid, or some other form of mechanical or electrical driving mechanism. The shutter is released in response to manual actuation of a button 44. Assuming the shutter to be electrically driven, suitable battery means (not shown) are to be understood as mounted within the camera housing at any convenient location to provide energization of the circuit.

A plate element 46 is mounted for slidable movement at the front of the camera between the lens-shutter-diaphragm assembly 28 which projects slightly forwardly from the web 24 and the front wall 12c of the camera. For the purpose, the transverse edges 46a of the plate are mounted in a pair of tracks or channels 48. The front wall 12c covers the major area of the plate 46 but includes a rectangular aperture 50 which provides that any given functional transverse section of the plate which may be aligned therewith as a result of its movement is always uncovered. Slidable movement of the plate 46 is effected by manual actuation of a handle 52 which projects forwardly through an elongated slot 54 formed in the front wall 12c. The position of the plate, namely, its vertical position, as illustrated, is determined by detent means comprising the plurality of predeterminedly-spaced recesses 56 formed in its edges and means for entering and engaging the recesses comprising the ball 58, the compression spring 60 biasing the ball toward a recess, and the cap or housing 62, the latter to be understood as mounted at an approximate vertical center point of the side wall 12d, for example, in an aperture formed therein. An identical engaging means is preferably mounted on the other side wall 12c.

The rectangularly-shaped plate 46 is preferably, although not necessarily opaque and is formed, for example, of a plastic material such as an acrylic or of a metal. It is positioned in a plane normal to the optical axis 64 of the objective, and its movement is parallel to the planes of the web 24 and the front wall 12c. It is to be noted that the plate is spaced somewhat forwardly of the web 24. Assuming the plate 46 to be composed of a plastic, the channels 48 may, advantageously, be formed of a metal such as aluminum to provide a suitable slidable relationship. Along a vertical center line and adapted to be selectively aligned with the objective comprising the lenses 66, 68 and 70 are disposed, respectively, a positive lens 72, a shaped, e.g., circular light-admitting aperture 74, and a negative lens 76. While the objective is shown as a triplet of given structure, it is to be understood that an objective of modified design could be employed. The lenses 72 and 76 may be termed "supplemental" lenses inasmuch as they coact with the objective to provide a modified focus. At each side of, that is, offset laterally relative to the lenses 72 and 76 and the circular aperture 74, are two identical sets of projecting lenses 78, 80 and 82 arranged in a diverging linear relationship. However, the lenses of a given set are of a predetermined relatively different effective focal length and power.

Two identical small projection lamps 84 and 84a are mounted on opposite tapered sides of the internal exposure chamber 20. Each lamp may, for example, be of a 3 volt, 1/10 ampere, .225 spherical candle-power type having an elongated filament. The filament of lamp 84 is disposed horizontally; that of lamp 84a being disposed vertically. Two elongated slots 86 are formed in the web 24 at dimensional mid-points thereof. The dimensions of each slot and its location in the web are such as to permit a functional beam from an associated one of the lamps 84 and 84a to pass therethrough and through that projection lens which happens to be aligned therewith. Assuming a pair of these beams 88 and 88a to be thus transmitted, their direction and resulting zone of convergence forwardly of the camera are controlled by both the lateral and front-to-rear positions of the lamps relative to the lateral spacing of each pair of the projection lenses which is then aligned with one of the lenses 72 and 76 or with the circular aperture 74.

When any pair of identical projection lenses is in lateral alignment with an associated one of the supplemental lenses 72 and 76 or with the circular aperture 74, the beams 88 and 88a are focused and converge at a given distance or zone in front of the camera to which the focus of the objective, in conjunction with an aligned supplemental lens, or alone if aligned with the aperture 74 is adjusted. If the photographic subject is not properly located at this zone the images $84^1$ and $84a^1$ of the respective projection lamp filaments formed in terms of bands of light will be laterally offset as represented in FIG. 2a and the focus of the objective as above described will be incorrect. If, however, the subject is correctly located, at the proper distance, the two images will be superimposed and form the cross shown in FIG. 2b, the focus of the objective and associated lens or aperture element of the plate 46 being correct. A distance-indexing or scale device providing readings commensurate with the distance information provided by the projection lenses is located at the upper housing wall 12a, for ready reference. This device consists of a flexible cable 90 attached at one end to the plate 46 by a bracket 92 and passing through a tubular longitudinally-slotted guide 94. A pointer 96 attached to the other extremity of the flexible cable and passing through the slot of the guide tube is positioned opposite relevant indicia and indicates the distance of the photographic subject to be established or already existing for a correct exposure.

If it is to be assumed that the shutter is to function in a fixed-time exposure capacity, as in the preferred embodiment, coupling means to provide variation of the aperture in conjunction with the distance and focus control means, above described, is required. A post or stud 98 projects rearwardly from the plate 46. When the plate is moved linearly to perform the aforesaid distance and focus adjustments, the stud 98 is caused to contact and move one of the radially-disposed pins 40 and 42, thereby providing rotation of the rings 36 and 32, accompanied by movement of the blades 30 to vary the aperture 34. As illustrated in FIGURE 1, any upward movement of the plate 46 and stud 98, which occurs consistent with movement of the camera and subject to a more distant relationship and appropriate positioning of the components 72, 74, 76, 78, 80 and 82 of the plate, provides a counterclockwise movement of the rings 36 and 32 and widens the aperture. A movement of plate 46 in an opposite direction narrows the aperture. While the detent recesses 56, in addition to their positioning function previously described, may be considered as establishing three given aperture settings, it will be understood that additional or alternate means providing a more precise control of the aperture may also be included, as for example, damping means in contact with the ring 36, a gear sector and rack in place of the pins 40 and 42 and post 98, gear reduction means, additional detent means, etc.

While a shutter embodying the aforesaid fixed-time characteristics has been set forth as a preferred embodiment of the present invention, it would be possible in a modification of the camera to provide a time-control type of shutter and a fixed aperture. If such an instance, the aperture-control means, above described, would not be included.

Figures 3, 4:
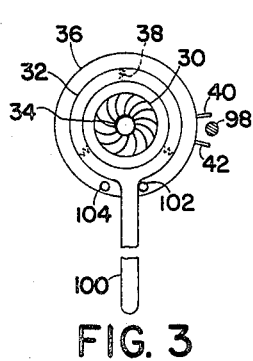
FIG. 3 is a diagrammatic front view of adjustable diaphragm aperture means illustrating a setting thereof for color film.
FIG. 4 is a diagrammatic front view of adjustable diaphragm aperture means illustrating a setting thereof for relatively faster black-and-white films.

The camera is adapted to use either a color-film such as one having an ASA speed of 75, or a much faster black-and-white film as, for example, one having an ASA speed of 3000. To accommodate to these widely divergent film speeds, means are provided to greatly reduce the aperture in conjunction with the faster film. A diaphragm opening substantially appropriate to the 75 speed color-film is illustrated in FIG. 3 and may be assumed as that existing with the plate 46 positioned as shown in FIGURE 1. A lever 100, FIGS. 3 and 4, integral with the ring 32, is provided for narrowing the aperture as a preliminary adjustment when the faster black-and-white film is to be employed. This is accomplished by holding the outer ring 36 stationary, as by holding the plate 46 against movement, and moving the lever and inner ring 32 in a clockwise direction from the stop 102 to contact with the stop 104. A choice of three such smaller apertures 34*a* will thus be provided for the black-and-white film at the three positions of plate 46 effected by the detent recesses 56.

A further modification of exposure-control means may be provided in the form of a plurality of neutral-density light filters, employed selectively in alignment with the lens elements 72 and 76 and the circular aperture 74. These filters are employed as supplemental components as, for example, where light-reducing means additional to aperture reduction are required in conjunction with an extremely fast film, or even as substitutes for the aperture-control means described. However, they constitute a less-preferred embodiment in the latter capacity because of their limitations with respect to achieving a desired depth of field.

Assuming, for example, an electronic shutter of fixed-time characteristics to be employed, it is desirable to include means for preventing its actuation until distance and focus settings have first been established through positioning of the plate 46, as described. To achieve this objective it may be assumed that depression of the button 106 operates a switch closing the circuit to the projection lamps 84 and 84*a* and providing, by suitable drive means, rotation of the flash-cube 18 to a functional position. Through a circuit interlock, not shown, the button 44, which is adapted to close a switch actuating release of the shutter and, through the contacts of the latter, energizing the flash-cube at X synchronization, is rendered functionally inoperative until the button 106 has first been depressed. Thereafter the shutter and flash-cube may be operated by pressing the button 44.

A pair of pressure rolls 108 and 110 is shown located in the rear section 14 of the camera adjacent to an elongated aperture 112. The removable rear section 14 of the camera is to be considered as adapted to accommodate a film material, e.g., a film pack, each unit of which includes a processing liquid. The liquid is released and spread between internal layers thereof including an exposed photosensitive emulsion when the unit is subjected to progressive compression to provide a completed print immediately following the exposure by a diffusion transfer process of image formation. Film materials of the character described are commercially available and are sold by Polaroid Corporation, Cambridge, Mass., U.S.A. It is to be assumed that a film unit of the aforesaid category is positioned with its emulsion at the focal plane 22, at which location it is correctly exposed through the strumentality of the distance-, focus-, and aperture-control means of the present invention which have been described hereinbefore. It is then manually advanced between the pressure rolls 108 and 110 and through the slot 112, as by appropriate tab means of the film material intended for the purpose, to effect its processing. As previously intimated, an immediate ascertainment of the quality of the print is of advantage with respect to the type of photography to which the subject camera is peculiarly adapted.

Figure 5:
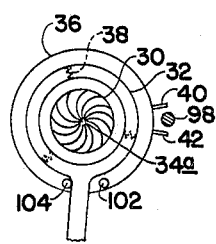
FIG. 5 is a diagrammatic fragmentary front view of a modification of the projection lenses of FIGURE 1.

Certain modifications of the structure and arrangement of the lenticular components of the plate 46 are possible. FIGURE 5 illustrates one such modification, namely, the substitution of a plurality of vertically aligned optical wedges 114, 116 and 118 of differential thickness and light-bending ability, incorporated with a plate 46*a*, for the sets of divergently-arranged projection lenses shown in FIGURE 1. Another modification contemplates a plurality of vertically aligned lenses having their optical axes progressively disposed at different acute angles with respect to the optical axis of the objective. A still further modification might involve a lateral movement of the projection lenses. It will also be apparent that although the plate 46 is shown as carrying two supplemental lenses 72 and 76 and two sets of projection lenses, each set including three lens components, a greater or lesser number of such lenses could be employed in a modified system for obtaining other settings. Wherein a flash-cube has been shown as a source of illumination, it would be possible to provide instead an electronic-flash device for the purpose by adapting the shutter thereto.

FIGS. 6, 7 and 8 illustrate, by way of example, the arrangement of elements relating to the three distances at which the superimposed images of the lamp filaments, in the pattern of the luminous cross of FIG. 2*b*, are adapted to be formed on a photographic subject. It is, of course, obvious that the locations shown in these figures of the zones 120, 122 and 124 at which the image superimposition occurs are merely illustrative and are not sufficiently spaced from the camera components, their actual distances being those given in the scale printed at the upper surface of the camera.

Certain data relating to the optical properties and disposition of the components, assuming the aforesaid given distances of the photographic subject, will now be given. The objective, a triplet composed of lens elements 66, 68 and 70, has an effective focal length of 4.5 inches for an infinity distance (4.8 inches for an object at 6 feet). The width of the film material at the focal plane 22 may be taken as approximately 4 inches. Each of the lamps 84 and 84*a* is spaced laterally 2¼ inches from the optical axis 84 and, rearwardly, approximately 5 inches from the plane of the plate 46.

Assuming the 6 foot distance setting of FIG. 6, the effective focal length of the projection lenses 80 is 4.68 inches. The power of these lenses is 8.41 diopters. The lenses 122 are not provided in the camera of FIGURE 1 but offer an alternative structure. They are achromatic lenses which, if included, would permit the employment of identical projection lenses at all three positions of the plate 46.

FIG. 7 illustrates the 11 foot distance setting. In this instance the supplemental lens 76 is a negative lens having a power of —.25 diopter. The projection lenses 82 have an effective focal length of 4.80 inches and a power of 8.20 diopters. The optical center of each lens 82 is located at 2.161 inches from the optical axis 64.

In FIG. 8, representing the 4½ foot distance setting, the supplemental lens 72 is a positive lens having a power of +.25 diopter. The projection lenses 78 have an effective focal length of 4.54 inches and a power of 8.66 diopters. The optical center of each lens 78 is located at 2.044 inches from the optical axis 64.

It is contemplated that the plate 46, including its lenticular components, if formed of a transparent plastic material, is to be manufactured as an integral unit, for example, by an injection-molding process. This, undoubtedly, would enable its production at a relatively low cost. If such a method of manufacture were employed, the areas surrounding the lenticular components could, subsequently, be rendered opaque by painting, coating, or by any other suitable method. Alternatively, the plate could, initially, be composed of an opaque material and merely have a plurality of apertures for acceptance of the lenticular elements therein, the latter being inserted and fixed in the proper apertures.

Figure 2:
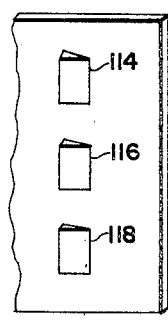
FIG. 2 is a diagrammatic front view of projected images of light-source filaments of the distance-establishing means.

Assuming the inclusion of the fixed-time shutter and the aperture control means illustrated in FIGS. 1, 2 and 3, the following considerations are of significance. When using the aforementioned 75-speed color film, at a distance of 6 feet, the aperture would be approximately 0.152 inch. This setting is that generally illustrated in FIG. 3. At a distance of 11 feet, it would be approximately 0.511 inch. At 4½ feet it would be 0.085 inch. When using the 3000-speed black-and-white film, involving the aperture-adjustment means of FIG. 4, at a distance of 6 feet, the aperture would be .0038 inch; at a distance of 11 feet, it would be 0.0128 inch; and at 4½ feet, it would be .0021 inch. Because of the minuteness of these openings and the attendant difficulty of manufacturing a shutter capable of producing them, it is conceivable that for black-and-white film of such fast ASA speeds, the openings for color film might still be employed but in conjunction with suitable neutral-density filters. Another method might involve the use of a slower film or a modified form of exposure control.

With reference to the light-emitting properties of a standard flash-cube 18 and the fixed-time shutter operation, it is proposed to utilize the light of each flash-bulb of the cube which is produced during its complete burn-out time for the photographic exposure. This time has a duration of approximately 30 milliseconds. A shutter speed speed of 1/25 second is appropriate thereto and, moreover, is sufficiently rapid to permit a reasonable degree of subject movement during the exposure. Assuming, for example, the pertinent flash-bulb guide-number to be 85, at the six-foot distance setting, the relative aperture would be f/14.

Since certain changes may be made in the above apparatus without departing from the scope of the invention herein involved, it is intended that all matter contained in the above description, or shown in the accompanying drawings, shall be interpreted as illustrative and not in a limiting sense.

What is claimed is:

1. Camera apparatus for use with flash means in a generally low-level lighting environment to provide consistently correct photographic exposures, said apparatus comprising a housing, a flash unit of given light-producing properties mounted on said housing, an objective of given focal characteristics mounted adjacent to and aligned with an aperture formed in the front wall of said housing, shutter and diaphragm means having, respectively, given time and aperture characteristics, means providing a focal plane adjacent to the rear wall of said housing for positioning thereat the emulsion of a photographic film material, a pair of projection lamps mounted in a given plane and in a given spaced relation at each side of a rearward extension of the optical axis of said objective, and a plate element mounted between said objective and said apertured front wall for slidable linear movement in a direction normal to said optical axis in response to manual actuation thereof, said plate element including, linearly disposed along a center line thereof, a light-admitting aperture and a plurality of supplemental lenses of differential focal characteristics for individual alignment with said objective when said plate element is moved to control the focus thereof, two identical sets of positive projection lenses, each set including a plurality of linearly-disposed lenses of relatively differential focal characteristics and so located transversely at an opposite side of said light-admitting aperture and said supplemental lenses and so predeterminedly spaced therefrom that when a given one of said light-admitting aperture and supplemental lenses is aligned with said objective, each lens of a given pair of said projection lenses of similar focal characteristics is positioned substantially in the plane of said light-admitting aperture and supplemental lenses, at an opposite side thereof and, depending upon the position of said plate element, in the path of a beam from one of said lamps so that said pair of lenses projects a pair of images of said filaments to superimposition at a distance forwardly of the camera which defines a correct location of a photograph subject relative to the then-existing focus of said objective.

2. Camera apparatus, as defined in claim 1, wherein said linearly-disposed projection lenses at one side of said supplemental lenses and light-admitting aperture are divergently arranged with respect to said projection lenses at the other side.

3. Camera apparatus, as defined in claim 2, wherein said objective extends forwardly through a central aperture formed in a transversely-disposed internal web which includes a pair of predeterminedly-spaced elongated apertures located at either side of said central aperture permitting passage of the beams from said projection lamps to said projection lenses.

4. Camera apparatus, as defined in claim 1, wherein there is provided an internal exposure chamber mounting said objective in an apertured forward wall thereof located immediately to the rear of said transverse web, said internal chamber flaring rearwardly toward said focal plane and said projection lamps being mounted on the external surfaces of opposite side walls of said internal chamber.

5. Camera apparatus, as defined as claim 1, wherein the filaments of said projection lamps are elongated and relatively disposed substantially at 90°, the images of said filaments forming a cross when superimposed.

6. Camera apparatus, as defined in claim 1, wherein said plate, exclusive of said lenses thereof, is opaque.

7. Camera apparatus, as defined in claim 1, wherein said plate includes said lenses as components of an integral structure.

8. Camera apparatus, as defined in claim 1, wherein the lateral edges of said plate are mounted for slidable movement in a pair of channels at opposite sides of said camera housing and wherein a given one of said supplemental lenses and light-admitting aperture is positioned in alignment with said objective, with an associated pair of said projection lenses positioned in alignment with said elongated slots of said web through the instrumentality of detent means incorporated in part with said slidable plate and in part with fixed portions of said camera.

9. Camera apparatus, as defined in claim 1, wherein is provided means mounted on said camera housing for visually framing a photographic subject.

10. Camera apparatus as defined in claim 1, wherein said film material, adapted to use therewith, is of a type containing a processing liquid and is adapted to undergo processing when exposed and subjected to compression, and wherein said camera apparatus includes compressive means for effecting said processing thereof.

11. Camera apparatus, as defined in claim 1, wherein is included indexing means for visibly indicating distances of said photographic subject equivalent to the zones of superimposition of said filament images.

12. Camera apparatus for use with flash means in a generally low-level lighting environment to provide consistently correct photographic exposures, said apparatus comprising a housing, a flash unit of given light-producing properties mounted on said housing, an objective of given focal characteristics mounted adjacent to and aligned with an aperture formed in the front wall of said housing, a shutter of given fixed time characteristics, diaphragm means including an adjustable element for varying the aperture thereof, engageable means integral with said adjustable element for effecting its rotation, means providing a focal plane adjacent to the rear wall of said housing for positioning thereat the emulsion of a photographic film material, a pair of projection lamps mounted in a given plane and in a given spaced relation at each side of a rearward extension of the optical axis of said objective, the filaments of said lamps being disposed differentially relative to one another, a plate element mounted between said objective and said apertured front wall for slidable linear movement in a direction normal to said optical axis in response to manual actuation thereof, and detent means for establishing a plurality of given locations of said plate element, said plate element including means for engaging said engageable means of said adjustable element of the diaphragm means to provide movement thereof responsive to movement of said plate element, and further including, linearly disposed along a center line thereof, a light-admitting aperture and a plurality of supplemental lenses of differential focal characteristics for individual alignment with said objective when said plate element is thus moved to control the focus thereof, two identical sets of positive projection lenses, each set including a plurality of linearly-disposed lenses of relatively different focal characteristics so located transversely at an opposite side of said light-admitting aperture and said supplemental lenses and so predeterminedly spaced therefrom that when a given one of said light-admitting aperture and supplemental lenses is positioned in front of said objective, each lens of a given pair of said projection lenses of similar focal characteristics is positioned in the plane of said light-admitting aperture and supplemental lenses but laterally at an opposite side thereof and, depending upon the position of said plate element, in the path of a beam from one of said lamps so that said pair of lenses projects a pair of images of said filaments to superimposition at a distance forwardly of the camera which defines a correct location of a photographic subject relative to the then-existing focus of said objective.

13. Camera apparatus, as defined in claim 12, wherein the speed of said shutter is chosen to encompass the burn-out time of said flash unit.

14. Camera apparatus, as defined in claim 12, wherein said means of said plate element for engaging said engageable means of diaphragm means is a stud projecting rearwardly from said plate element, and wherein said engageable means comprises a pair of pins projecting radially from said adjustable element of said diaphragm means and adapted to be actuated by said stud.

15. Camera apparatus, as defined in claim 12, wherein said means of said plate element for engaging said engageable means of said diaphragm means is adapted to produce movement of said adjustable element thereof in a direction for providing a minimal aperture of said diaphragm means coincidental with a positioning of said plate element effective to bring the projection lenses of the latter to a location for projecting said pair of filament images to superimposition at a location which is that nearest to the camera.

16. Camera apparatus, as defined in claim 13, wherein said burn-out time is approximately 30 milliseconds and said shutter speed is approximately $1/25$ second.

17. Camera apparatus, as defined in claim 12, wherein is included means for adjusting the aperture of said diaphragm means independently of said engaging means of said plate element for preliminarily accommodating to different film speeds.

18. Camera apparatus, as defined in claim 12, wherein is provided a plurality of neutral-density filters for alignment with said circular aperture and said supplemental lenses to reduce the intensity of the light admitted by said diaphragm means.

References Cited

UNITED STATES PATENTS

| | | |
|---|---|---|
| 3,388,646 | 6/1968 | Sullivan. |
| 3,388,650 | 6/1968 | Westphalen. |
| 3,418,908 | 12/1968 | Land. |

NORTON ANSHER, Primary Examiner

DAVID B. WEBSTER, Assistant Examiner